(12) United States Patent
Inoue

(10) Patent No.: US 6,229,580 B1
(45) Date of Patent: May 8, 2001

(54) IMAGE COLOR CORRECTION APPARATUS AND RECORDING MEDIUM HAVING COLOR PROGRAM RECORDED THEREON

(75) Inventor: Akira Inoue, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 08/972,347

(22) Filed: Nov. 17, 1997

(30) Foreign Application Priority Data

Nov. 18, 1996 (JP) .................................................. 8-306735
Jun. 17, 1997 (JP) .................................................. 9-159457

(51) Int. Cl.[7] .............................. H04N 9/69; H04N 9/68; G03F 3/08; G09G 5/04
(52) U.S. Cl. ........................... 348/649; 348/649; 348/645; 348/646; 348/661; 358/518; 358/519; 358/520; 358/523; 345/153; 345/430; 345/431
(58) Field of Search ..................... 348/645, 646, 348/647, 649, 651, 660, 661, 650, 576, 577, 703, 722; 358/518–523; 345/153, 430, 431

(56) References Cited

U.S. PATENT DOCUMENTS

| | | | | |
|---|---|---|---|---|
| 5,144,420 | * | 9/1992 | Omuro | 358/80 |
| 5,268,753 | * | 12/1993 | Yamaguchi | 358/527 |
| 5,335,097 | * | 8/1994 | Murakami | 358/520 |
| 5,446,504 | * | 8/1995 | Wada | 348/645 |
| 5,461,429 | * | 10/1995 | Konishi et al. | 348/656 |
| 5,552,904 | * | 9/1996 | Ryoo et al. | 358/518 |
| 5,900,860 | * | 5/1999 | Ueda | 345/150 |

FOREIGN PATENT DOCUMENTS

| | | |
|---|---|---|
| 4-236571 | 8/1992 | (JP) . |
| 4-334267 | 11/1992 | (JP) . |
| 6-121159 | 4/1994 | (JP) . |
| 8-032827 | 2/1996 | (JP) . |

OTHER PUBLICATIONS

Kaji "Printing Image Engineering", Printing Division of the Printing Engineering Society of Japan, 1988, pp. 376–379.
Tajima "Theory of Color Image Reproduction", Maruzen, 1996, pp. 71–74.

* cited by examiner

Primary Examiner—Reinhard Eisenzopf
Assistant Examiner—Paulos Natnael
(74) Attorney, Agent, or Firm—Foley & Lardner

(57) ABSTRACT

The invention provides an image color correction apparatus by which a hue in a desired region in a color image can be corrected to a desired hue readily. Based on a hue and a hue range designated, a color approximation degree $hx$ of each of noticed pixels of input pixels of an input signal is calculated, where HSV values are represented by $(h1, s1, v1)$, in accordance with $hx=((m-|Hue-h1|)/m) \times s1 \times v1$, and where correction coefficients of color signals R, G and B of each of the input pixels are represented by $(a1, a2, a3)$, the color signals $(R, G, B)$ are corrected to $(R', G', B')$ so that the corrected color signals $(R', G', B')$ may satisfy $(R', G', B')=(R, G, B)+hx \times (a1, a2, a3)$.

15 Claims, 15 Drawing Sheets

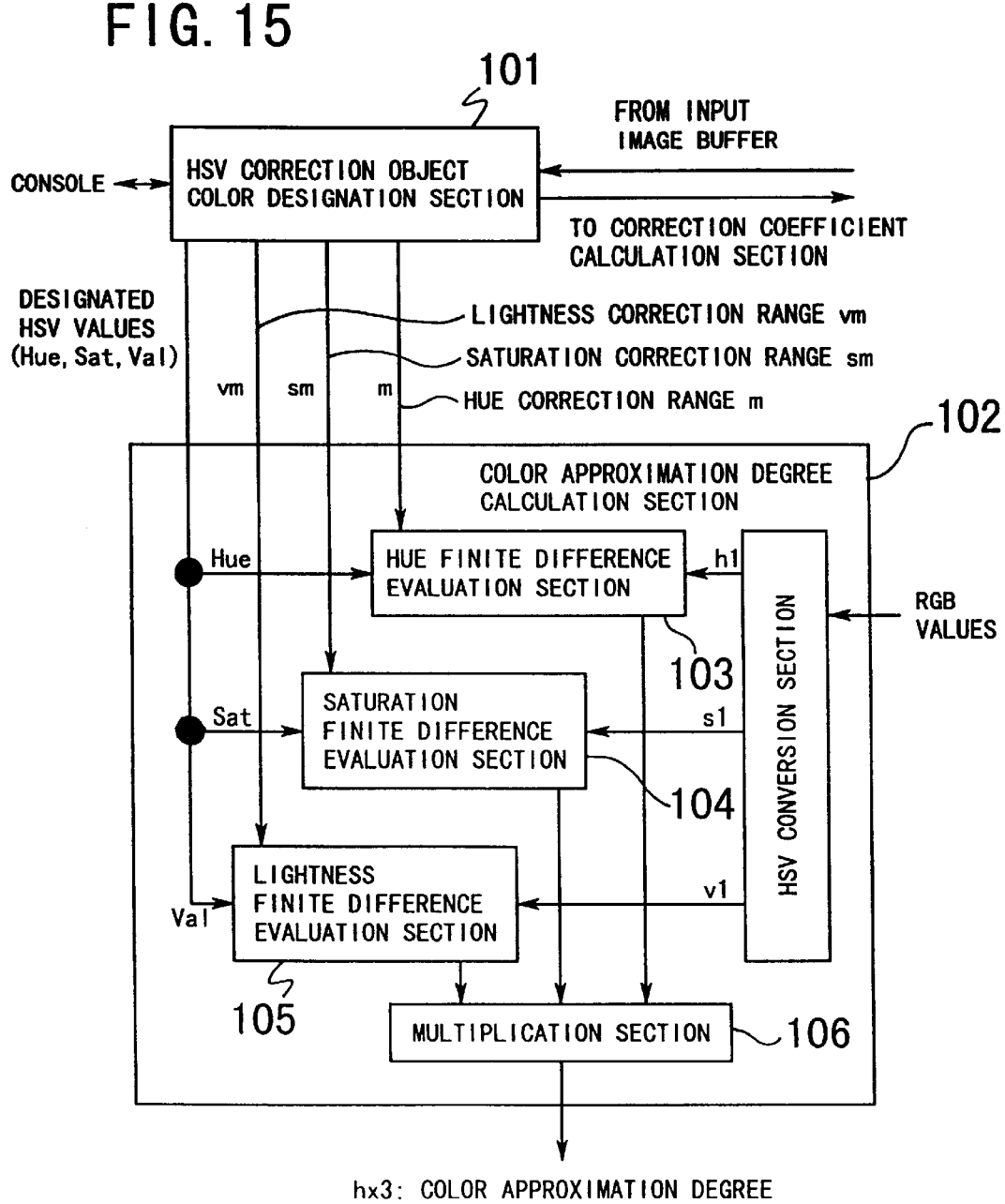

IMAGE COLOR CORRECTION APPARATUS AND RECORDING MEDIUM HAVING COLOR PROGRAM RECORDED THEREON

BACKGROUND OF THE INVENTION

1. Field of the Invention

This invention relates to a digital image signal processing technique, and more particularly to a technique of correcting a color tone of a color display screen of a computer apparatus, a television screen, a copying machine, a photograph, a print, a color facsimile and other apparatus by which a color image is displayed. More specifically, the present invention relates to an apparatus which can correct, when to correct a particular color tone displayed on a screen, the particular color tone displayed on the screen independently or can correct not only the particular color tone but also other color tones than the particular color tone in an associated relationship.

2. Description of the Related Art

In the first of color printing, a technique of correcting or modifying a finished color tone is conventionally known. A skilled person visually observes a color page of a trial print to discriminate whether or not the color tone of each part coincides with the color tone of an original or coincides with the color tone of an actual imaged object, and effects correction of a color mixture ratio for some color tone to effect desired printing.

Meanwhile, a technique of performing color tone processing using digital signal processing has been developed. According to the technique which involves digital signal processing, correction of various color tone offsets can be performed by calculation processing of signals (refer to Japanese Patent Laid-Open Application No. Heisei 4-334267).

As one of image correction apparatus of the type mentioned, a color correction apparatus for 6 different colors is known. A color correction apparatus for 6 different colors is disclosed in Kaji, "Printing Image Engineering", Printing Division of the Printing Engineering Society of Japan, 1988, pp. 376–379 and Tajima, "Theory of Color Image Reproduction", Maruzen, 1996, pp. 71–74, and so forth, and is mounted as a color modification apparatus for a scanner in a printing apparatus or a like apparatus. With the color correction apparatus for 6 different colors, a user selects a hue to be corrected from among six hues of R, G, B, C, M and Y (red, green, blue, cyani magenta and yellow) and corrects the colors of only pixels which belong to the designated hue. For correction of CMYK (cyan, magenta, yellow and black) data, the following correction expression:

$$\begin{pmatrix} C' \\ M' \\ Y' \\ K' \end{pmatrix} = \begin{pmatrix} C & b11 & b12 & b13 & b14 & b15 & b16 \\ M & b21 & b22 & b23 & b24 & b25 & b26 \\ Y & b31 & b32 & b33 & b34 & b35 & b36 \\ K & b41 & b42 & b43 & b44 & b45 & b46 \end{pmatrix} \begin{pmatrix} 1 \\ dC \\ dM \\ dY \\ dR \\ dG \\ dB \end{pmatrix}$$

is used. Meanwhile, where the system described is applied to RGB data, the following correction expression:

$$\begin{pmatrix} R' \\ G' \\ B' \end{pmatrix} = \begin{pmatrix} R & c11 & c12 & c13 & c14 & c15 & c16 \\ G & c21 & c22 & c23 & c24 & c25 & c26 \\ B & c31 & c32 & c33 & c34 & c35 & c36 \end{pmatrix} \begin{pmatrix} 1 \\ dR \\ dG \\ dB \\ dC \\ dM \\ dY \end{pmatrix}$$

is used.

In the expressions above, dC, dM, dY, dR, dG and dB represent color components of cyan, magenta, yellow, red, green and blue of pixels in an original image, respectively. The values of them are hereinafter referred to as color approximation degrees of the color components. Further, the coefficients b11 to b46 and c11 to c36 are correction coefficients for different hues and are adjusted in an interactive fashion.

FIG. 9 is a diagrammatic view illustrating an RGB space projected on a plane perpendicular to an axis of white and black components. This projection plane is divided into specific color areas of ① to ⑥. In other words, except gray components, all pixel values belong to the specific color areas of ① to ①.

A method of calculating color approximation degrees (dR, dG, dB, dC, dM, dY) of the six hues from RGB values of pixels is illustrated in Table 1 below.

TABLE 1

| Color Area | Condition | dR | dG | dB | dC | dM | dV |
|---|---|---|---|---|---|---|---|
| ① | R > G > B | R − G | 0 | 0 | 0 | 0 | G − B |
| ② | G > R > B | 0 | G − R | 0 | 0 | 0 | R − B |
| ③ | G > B > R | 0 | G − B | 0 | B − R | 0 | 0 |
| ④ | B > G > R | 0 | 0 | B − G | G − R | 0 | 0 |
| ⑤ | B > R > G | 0 | 0 | B − R | 0 | R − G | 0 |
| ⑥ | R > B > G | R − B | 0 | 0 | 0 | B − G | 0 |

The conventional apparatus realizes such calculation using an IC. Further, a distribution in color approximation degree dR of R is illustrated in FIG. 9. It can be seen from FIG. 9 that pixels having R components are present in color approximation areas ① to ⑥.

In the conventional apparatus, hues which can be designated are fixed to the predetermined six hues, and correction for intermediate hues or only for a color having a low saturation is impossible. For example, if an R hue is designated, then the range in which correction is possible includes a hue range (±60 degrees) designated in FIG. 9. Accordingly, if it is tried to correct a particular hue, also patterns of hues of a same color family are corrected simultaneously.

On the other hand, in color printing, much time is required for hue correction. In particular, a skilled operator performs correction while performing complicated manual operations based on its abundant experience. A skilled person can effect hue correction finally as desired. However, a person who does not have abundant experience cannot perform such manual operations. Further, in many cases, manual operations which require such long time cannot be performed.

For example, as a technique which has spread widely in recent years, a technique wherein a person who does not have sufficient experience observes an output screen of a computer and manually operates a mouse to designate a desired region of an image so that the hue of the region is replaced simply with another hue is available.

Such a technique as just described is employed widely in various types of occupation which involve designing and can be utilized also for production of a home page when a user of a computer tries to provide a home page on the Internet. It can be considered that almost all of such users have little technical knowledge of color correction, and it is impossible for them to perform a complicated operation based on abundant experience as described above.

Further, where the technique described above is used in such types of occupation which involve designing, such a manner of use that the user effects simulation while observing a color image of a computer in front of an ordering person of the design and discusses the design with the ordering person of the design. In such an instance, it is required to replace a hue with another hue at a moment, and an apparatus which involves operations which require much time is not suitable for the application just described.

SUMMARY OF THE INVENTION

It is an object of the present invention to provide an image color correction apparatus which can correct a desired hue without modifying other colors of a similar color family.

It is another object of the present invention to provide an image color correction apparatus by which a desired hue can be obtained without requiring complicated manual operations.

It is a further object of the present invention to provide an image color correction apparatus which does not change other hues than a designated hue.

It is a still further object of the present invention to provide an image color correction apparatus which can automatically perform correction of a hue.

It is a yet further object of the present invention to provide an apparatus by which color correction can be performed by a manual operation of a mouse while a screen of a personal computer is visually observed.

In order to attain the objects described above, according to an aspect of the present invention, there is provided an image color correction apparatus, comprising correction object designation means for designating a hue (Hue) and a hue range (m) which make an object of correction of an input image, color approximation degree calculation means for calculating, based on the hue and the hue range designated by the correction object designation means, a color approximation degree hx representative of an approximation degree of a hue of each of noticed pixels from among input pixels of the input image to the designated hue, correction coefficient designation means for designating, where correction coefficients of color signals R, G and B of each of the input pixels are represented by (a1, a2, a3), the correction coefficients, and means for correcting the color signals R, G and B to color signals R', G' and B' in accordance with (R', G', B')=(R, G, B)+hx×(a1, a2, a3)

where × is a multiplication symbol.

Here, in a plane represented by a color approximation degree (hue and saturation, i.e., H and S) as seen in FIG. 9, the hue (Hue) corresponds to an angle a indicated by alternate long and short dash lines in FIG. 9. In the present invention, the hue can be set by arbitrary designation. In particular, the hue can be set arbitrarily without being limited to 2π/6 (60 degree distance) as in the prior art. The designation may be performed, for example, by designating a color displayed on a screen. The designated color may be, for example, a color of clothes a model wears.

The hue range (m) corresponds to an angle β indicated by broken lines in FIG. 9. In particular, while the hue range is limited to ±60 degrees in the prior art, in the present invention, it can be designated arbitrarily as a hue range (m). The hue range may be inputted from a keyboard or may be designated by a mouse from among m values displayed on a screen. If the angle β shown in FIG. 9 is designated to a very small angle, that is, if the m value is designated to a very small value, color correction can be performed while hues other than the designated hue are little varied.

Preferably, the image color correction apparatus further comprises display means for displaying the input image as a color image, pointing means for pointing a point on a screen of the display means, and numerical value inputting means for inputting a numerical value, and wherein the correction object designation means designates a hue of a pixel value at a point on the screen pointed by the pointing means and a hue range inputted separately as the hue (Hue) and the color range (m), respectively, which make the correction object of the input image, and the correction coefficient designation means designates input values of the numerical value inputting means as the correction coefficients (a1, a2, a3).

In this instance, a predetermined region on a color image outputted from a computer can be pointed using a mouse or some other suitable pointing member to effect color correction with a desired hue at a moment. The correction coefficients (a1, a2, a3) determine to which color a hue of a correction object should be varied, and may be designated by a keyboard or a like apparatus. Alternatively, the correction coefficients (a1, a2, a3) may be calculated by selecting a color after variation from within a color pallet displayed on the screen in advance using a mouse.

Preferably, the hue range (m) inputted separately is selected from among a plurality of m values set in advance by a manual operation.

In this instance, a plurality of hue ranges for replacement are set and displayed at part of a color image outputted from a computer, and one of the hue ranges is pointed using a mouse or some other suitable pointing member. Consequently, a hue range for which color correction should be performed can be designated by a simple manual operation.

According to another aspect of the present invention, there is provided an image color correction apparatus, comprising RGB correction object designation means for designating a correction object color X (r0, g0, b0) of and a weight coefficient W to an input image, RGB color approximation degree calculation means for calculating, based on the correction object color X and the weight coefficient W designated by the RGB correction object destination means, a color approximation degree hx2 representative of an approximate value of a color of each of noticed pixels from among input pixels of the input image to the correction object color X, correction coefficient designation means for designating, where correction coefficients of color signals R, G and B of each of the input pixels are represented by (a1, a2, a3), the correction coefficients, and calculating means for correcting the color signals R, G and B to color signals R', G' and B' in accordance with (R', G', B')=(R, G, B)+hx2×(a1, a2, a3)

where × is a multiplication symbol.

According to a further aspect of the present invention, there is provided an image color correction apparatus, comprising correction object designation means for designating a hue (Hue), a saturation (Sat), a lightness (Val), a hue range (m), a saturation range (sm) and a lightness range (vm) which make an object of correction of an input image, color approximation degree calculation means for calculating, based on the hue and the hue range designated by the correction object designation means, a color approximation degree hx3 representative of an approximation degree of a hue of each of noticed pixels from among input pixels of the input image to the designated hue, correction coefficient designation means for designating, where correction coefficients for color signals R, G and B of each of the input pixels are represented by (a1, a2, a3), the correction coefficients, and means for correcting the color signals R, G and B to color signals R', G' and B' in accordance with (R', G', B')=(R, G, B)+hx3×(a1, a2, a3)

where × is a multiplication symbol.

With any of the image color correction apparatus described above, a color correction amount can be designated for any arbitrary color. Further, color correction can be performed at a moment without requiring any complicated manual operation. Accordingly, an operator can correct a color of an image by higher intuition. Further, with any of the image color correction apparatus, since any color than a designated hue is changed, only a necessary color can be corrected. Furthermore, correction of a flesh color can be performed automatically.

According to a still further aspect of the present invention, there is provided a computer-readable recording medium which has recorded thereon an image correction program based on which a computer executes a procedure for causing a hue (Hue) and a hue range (m) which make an object of correction of an input image to be designated, another procedure for calculating, based on the hue and the hue range designated, a color approximation degree hx representative of an approximation degree of a hue of each of noticed pixels from among input pixels of the input image to the designated hue, a further procedure for causing a color after correction to be designated, a still further procedure for calculating correction coefficients (a1, a2, a3) for color signals R, G and B of each of the input pixels from the color after correction, and a yet further procedure for correcting the color signals R, G and B to color signals R', G' and B' so that (R', G', B')=(R, G, B)+hx×(a1, a2, a3), where × is a multiplication symbol, may be satisfied.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 15 is a block diagram of a yet further color correction apparatus to which the present invention is applied.

DESCRIPTION OF THE PREFERRED EMBODIMENTS

Figure 1:
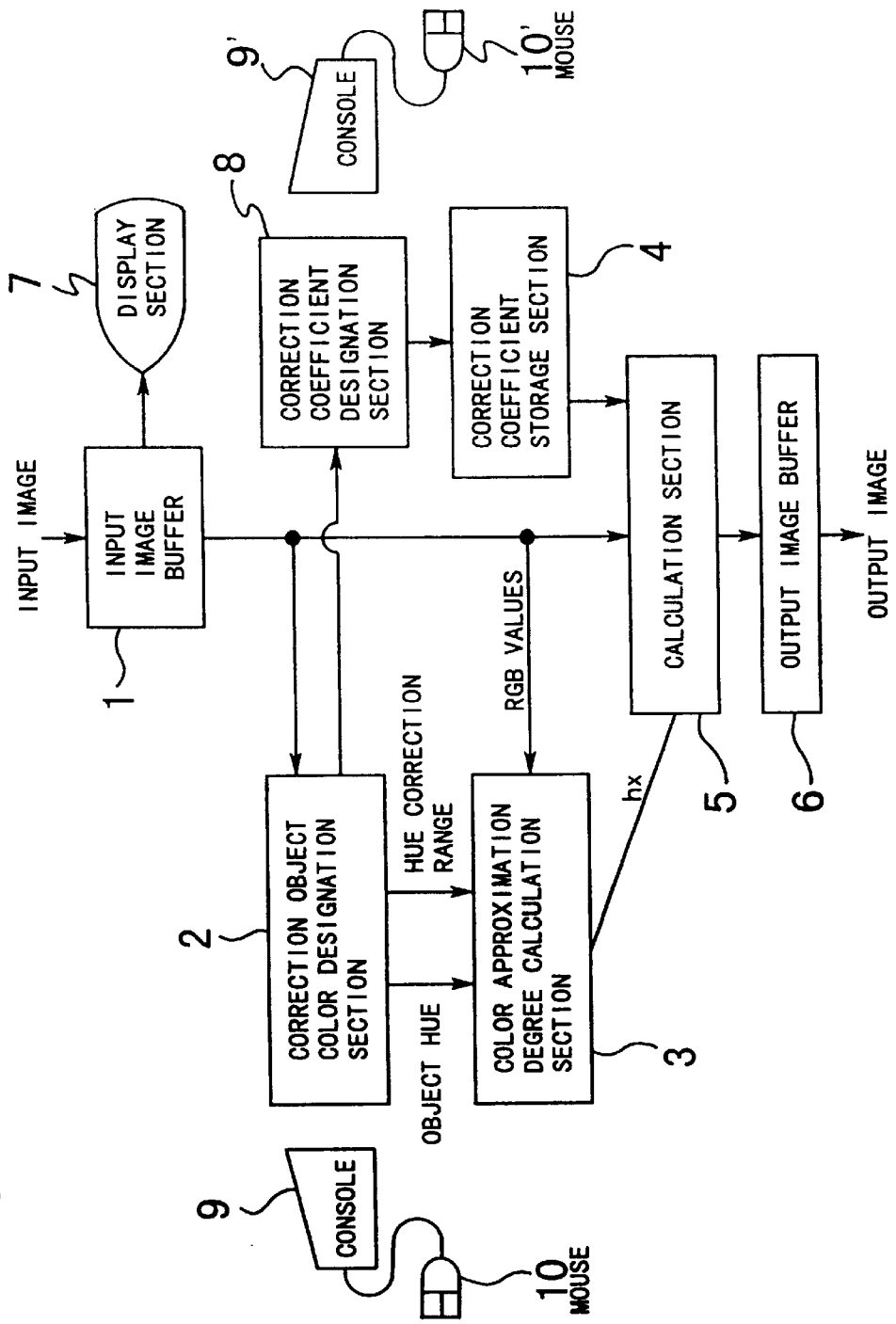
FIG. 1 is a block diagram showing a color correction apparatus to which the present invention is applied.

Referring first to FIG. 1, there is shown a color correction apparatus to which the present invention is applied. The color correction apparatus shown includes a correction object color designation section 2 serving as means for designating a hue (Hue) and a hue range (m) which make an object of correction of an input image, a color approximation degree calculation section 3 serving as means for calculating, where HSV values of a noticed pixel from among inputted pixels of the input image are (h1, s1, v1), a color approximation degree given by hx=((m−|Hue−h1|)/m)×s1×v1 from the hue and the hue range designated by the correction object color designation section 2, a correction coefficient designation section 8 serving as means for designating, where correction coefficients of color signals R, G and B of the inputted pixels are represented by (a1, a2, a3), respectively, the correction coefficients, and a calculation section 5 serving as means for performing correction so that corrected color signals may be (R', G', B')=(R, G, B)×hx×(a1, a2, a3)

The color correction apparatus further includes a display section 7 serving as display means for displaying the input image, a mouse 10 for pointing a point on a display screen of the display section 7, and a console 9 for inputting a parameter. The console 9 may be a keyboard, a digitizer or some other apparatus. Further, the correction coefficient designation section 8 includes a mouse 10' for pointing a point on the screen of the display section 7, and a console 9' for inputting a parameter. It is to be noted that the mouse 10 and the mouse 10' or the console 9 and the console 9' may be a physically same member.

It is to be noted that the color correction apparatus of the first embodiment further includes an input image buffer 1 for temporarily storing an input image therein, and an output image buffer 6 for temporarily storing and outputting an output image produced by the calculation section 5.

Figure 2:
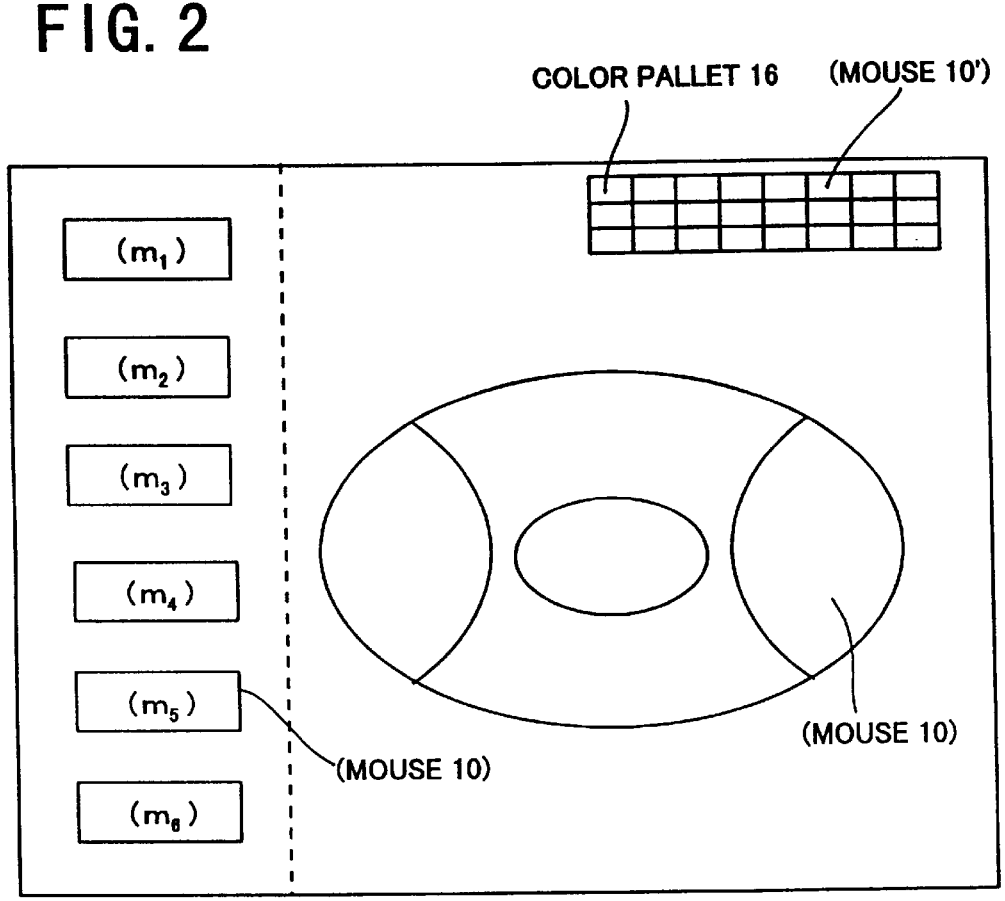
FIG. 2 is a schematic view showing a displaying condition of a display section of the color correction apparatus of FIG. 1.

FIG. 2 illustrates an example of a displaying condition of the display section 7. Referring to FIG. 2, an input image is displayed on the display screen of the display section 7, and a certain pixel in the input image is pointed by the mouse 10. In this instance, the correction object color designation section 2 determines the hue of the pixel on the screen pointed by the mouse 10 as a hue (Hue) which makes an object of correction of the input image. Or, a hue value as Hue may alternatively be designated by a value ranging from 0 degree to 360 degrees using the console 9.

In the display example of FIG. 2, the hue range (m) is selected by a manual operation of the mouse 10 or the console 9 from among a plurality of m values (m1 to m6) set in advance. Alternatively, a value may be inputted directly using the console 9. Further, in FIG. 2, a color pallet 15 is displayed, and a color Y after correction is pointed from within the color pallet 15 by the mouse 10'. The correction coefficient designation section 8 calculates correction coefficients (a1, a2, a3) from the color of the color pallet on the screen pointed by the mouse 10' and the color X of the pixel on the screen pointed by the mouse 10 and transmits the correction coefficients (a1, a2, a3) to a correction coefficient storage section 4. Where the color X of the pixel on the screen designated by the mouse 10 is represented by (r0, g0, b0) and the color y after correction designated by the mouse 10' is represented by (r2, g2, b2), the correction coefficient designation section 8 calculates (r2-r0, g2-g0, b2-b0) as the correction coefficients (a1, a2, a3). Alternatively, the correction coefficients (a1, a2, a3) may be designated using the console 9'.

Subsequently, operation of the color correction apparatus is described with reference to FIG. 3 which shows a detailed construction of the color approximation degree calculation section 3 and FIG. 4 which illustrates a concept of an HSV coordinate system. In the color correction apparatus, inputted RGB image data are converted into data of an HSV coordinate system by an HSV conversion section 31, and a difference in hue H outputted from a hue finite difference evaluation section 30 is multiplied by a saturation S and a lightness V by multiplication sections 32 and 33, respectively, to obtain a color approximation degree hx. Then, a pixel value is corrected using the color approximation degree hx.

Figure 4:
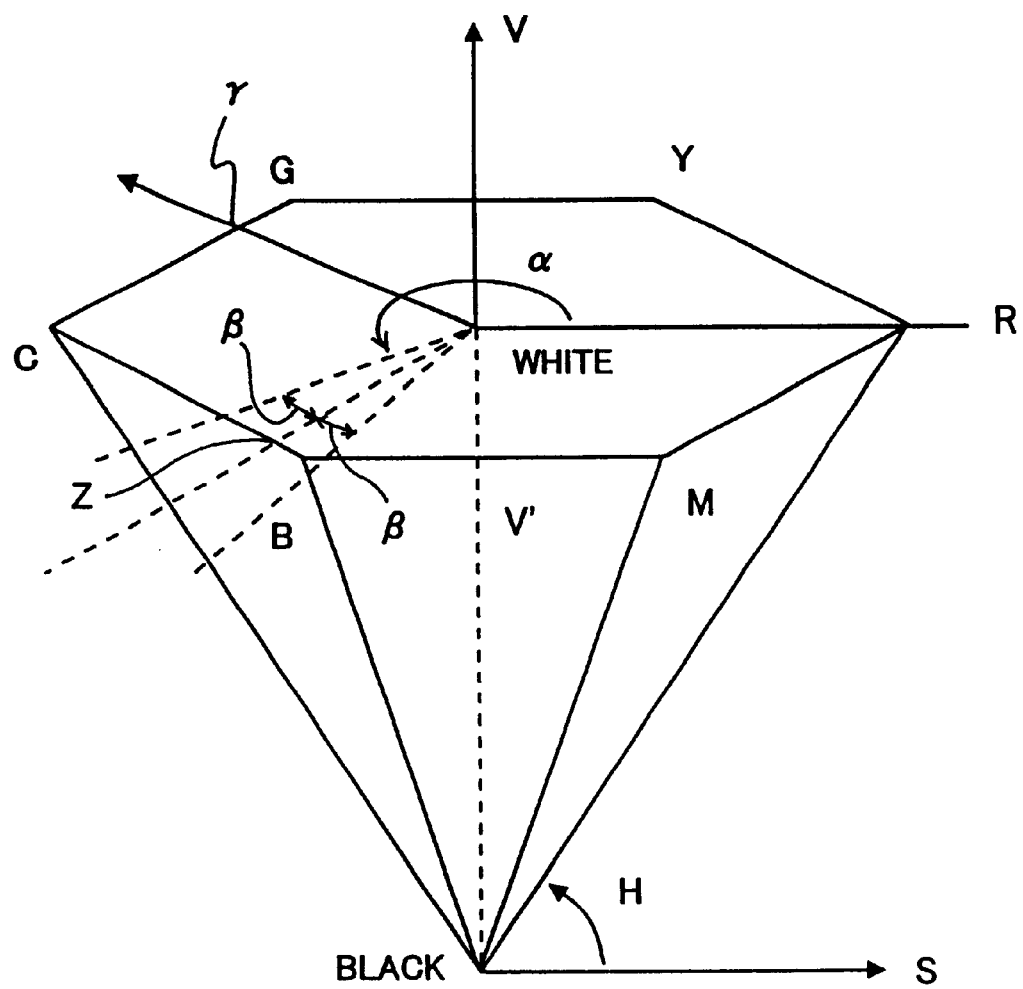
FIG. 4 is a diagrammatic view illustrating a concept of an HSV coordinate system.
Figure 5:
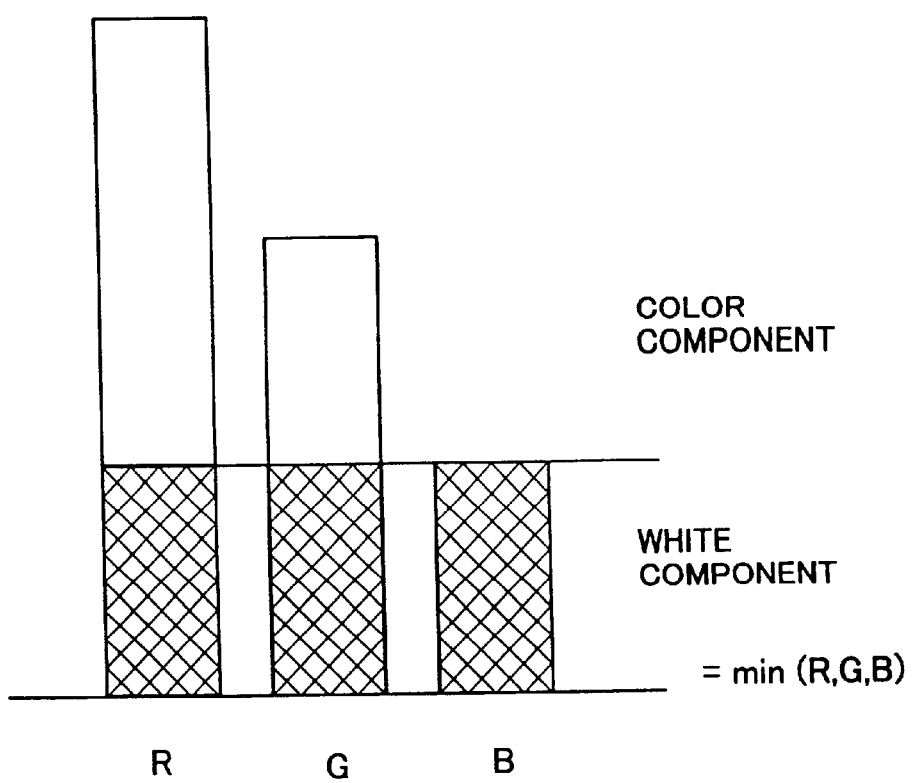
FIG. 5 is a diagrammatic view illustrating color components of R, G and B and white components.

In FIGS. 4 and 5, the axis which extends from the center line to an outer periphery represents the saturation S and the angle rotated in the counterclockwise direction represents the hue H. The basic axis S in FIG. 5 is positioned at the start point (H=0) of the hue. The hue (Hue) which makes an object of correction here is a rotational angle α. The hue range m corresponds to the angle β.

The present color correction apparatus re-arranges only colors which belong to a region defined by Hue+β and Hue−β and by white and black to an arbitrary color such as, for example, γ.

However, not all of the colors in this region are rotationally moved by an equal angle, but when a color Z whose hue is at the outermost of Hue is moved to the color γ, the amount of the movement decreases as the angle from Hue increases.

In other words, a color spaced by a little from Hue does not move to γ, but becomes an intermediate color in accordance with a difference in angle. Then, for another color which is spaced by more than the angle β, the amount of movement is 0. In concept, this amount of movement is the color approximation degree hx. In other words, even if S or V decreases, the amount of movement decreases.

While, in FIG. 5, γ is a color at an outer periphery of the hue, it can be changed not to this color but to any color by setting the coefficients (a1, a2, a3) for (R', G', B')=(R, G, B)+hx×(a1, a2, a3)

appropriately.

Actual operations are described. First, a region having a hue Hue to be corrected from within an image displayed on the display section 7 is pointed using the mouse 10. Then, a hue range m for correction is designated using the console 9 or the mouse 10. Thereafter, if a color after correction is designated from within the color pallet 15, then the correction coefficient designation section 8 calculates correction coefficients (a1, a2, a3). The calculation section 5 multiplies a color approximation degree hx calculated for each pixel based on the hue Hue and the hue range m by the RGB correction coefficients and adds the original pixel values to resulting values to effect color correction.

Although the HSV coordinate system accurately is a circular cylindrical coordinate system, a color space is in most cases represented by a hexagonal pyramid having summits R, B, C, M and Y. H denotes a hue and is represented by an angle ranging from 0 degree to 360 degrees in the counterclockwise direction taking the direction of R as "0". S denotes a saturation representing vividness of the color. S is "0" on the center line and increases toward a circumference. V denotes a lightness representing a luminosity. V represents black at the corresponding summit of the pyramid but represents white at the center of the bottom face (hexagon at the upper portion in FIG. 4). Conversion from the RGB coordinate system into the HSV coordinate system by the HSV conversion section 31 is performed in the following manner.

It is assumed that 0≦R, G, B≦MAX and 0≦H, S, V≦C MAX.

V=Imax=max(R, G, B)
  a) When V=0,
S=0, H=Unknown
  b) When V is any other than V=0,
S=[(Imax−Imin)×MAX]/Imax
  (Imin=min(R, G, B))
H=[(G−B)×MAX]/(Imax−Imin)
  (If (R=V))
H=[(B−R)×MAX]/(Imax−Imin)+MAX×2
  (if (G=V))
H=[(R−G)×MAX]/(Imax−Imin)+MAX×2
  (if (B=V))
Finally, H is normalized.
H=H/6
Conversion from the HSV coordinate system into the RGB coordinate system is performed in the following manner.
H=H/6
Imin=[V×(MAX−S)]/MAX
huepart=floor(h/MAX)
(floor(x) returns a maximum one of following integers)
hh=h−(huepart×MAX)

Imed1=(V×MAX−hh×(V−Imin))/MAX

Imed2=(hh×(V−Imin)+MAX×Imin)/MAX

Then, R, G and B are determined in the following manner depending upon the value of huepart:

when huepart=0: R=V, G=Imed2, B=Imin when huepart=1: R=Imed1, G=V, B=Imin when huepart=2: R=Imin, G=V, B=Imed2 when huepart=3: R=Imin, G=Imed1, B=V when huepart=4: R=Imed2, G=Imin, B=V when huepart=5: R=V, G=Imin, B=Imed1

Subsequently, a method of calculating the color approximation degree hx from the designated hue Hue and the hue range m of the color approximation degree calculation section 3 is described. In the following, it is assumed that H, S and V have been normalized so that $0 \leq H \leq 360$, $0.0 \leq S$ and $V \leq 1.0$. Where the HSV values of a noticed pixel are (h1, s1, v1), the color approximation degree hx of the pixel is calculated in accordance with hx=0 when Hue+M<h1 or h1<Hue−m, but in any other case, with $$hx=((m-|Hue-h1|)/m) \times s1 \times v1$$

Figure 3:
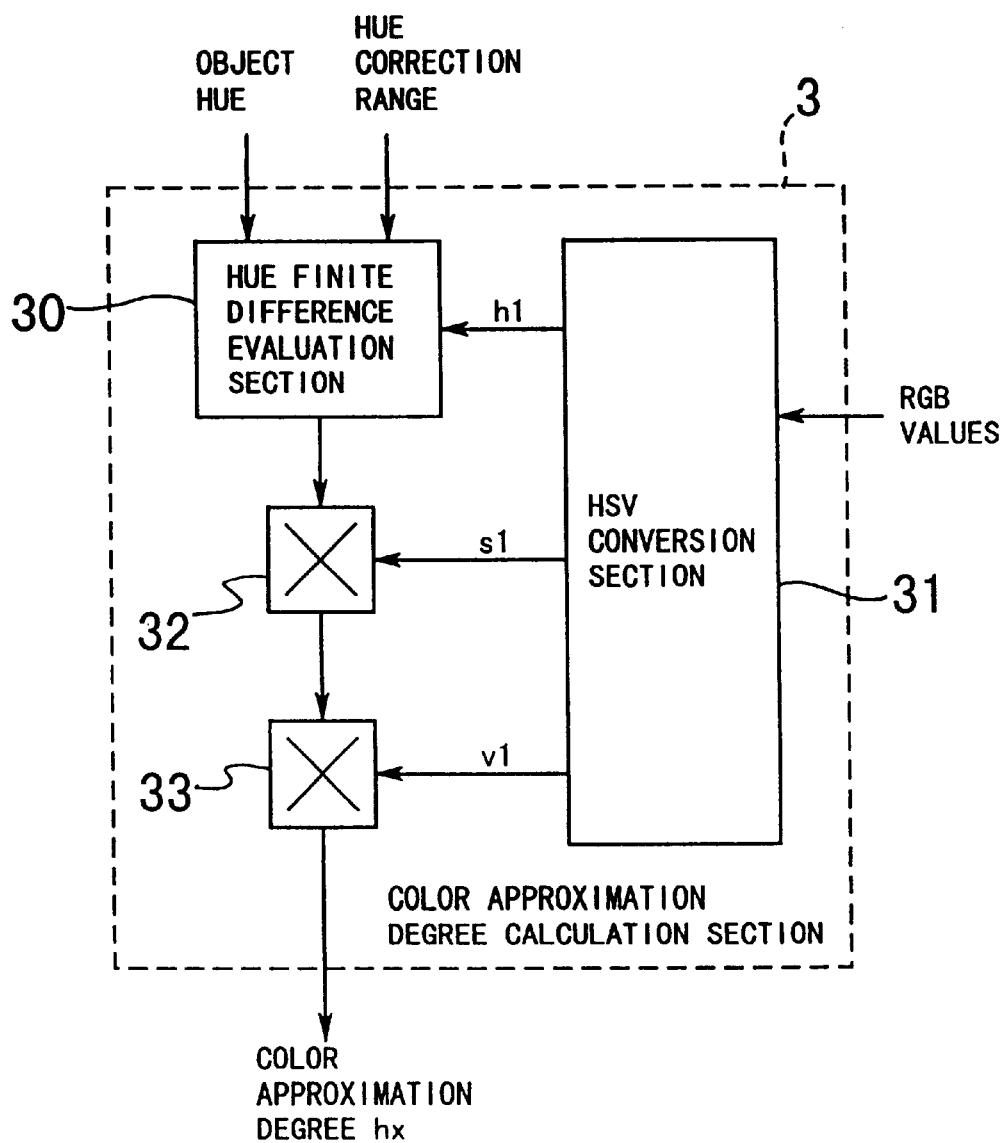
FIG. 3 is a block diagram showing a color approximation degree calculation section of the color correction apparatus of FIG. 1.

An example of the color approximation degree calculation section 3 is shown in FIG. 3. The hue finite difference evaluation section 30 receives, as inputs thereto, for each pixel, a hue Hue and a hue range m, which make an object of correction and a hue value h1 of the pixel and performs calculation of $((m-|Hue-h1|)/m$ to calculate a hue finite difference value. Then, the hue finite difference value is multiplied by a saturation value s1 and a lightness value v1 of the pixel by the multiplication section 32 and the multiplication section 33 to input the color approximation degree hx. Where the RGB correction coefficients are given as (a1, a2, a3), the correction expression is given by $$(R', G', B')=(R, G, B)+hx \times (a1, a2, a3)$$

A plurality of such correction coefficients are stored into the correction coefficient storage section 4, and suitable ones of the correction coefficients are selected in accordance with a correction amount outputted from the correction object color designation section 2 and outputted to the calculation section 5.

Further, as another method, finite differences of the RGB values may be used. The hue finite difference evaluation section 30 of the color approximation degree calculation section 3 uses the method just mentioned. According to the method, a color X to be corrected is first designated by R, G and B (as (r0, g0, b0)). From X and each pixel value in the image, a color approximation degree hx2 regarding the color X is calculated. The color approximation degree hx2 is multiplied by the correction coefficients of RGB, and resulting values are added to the original pixel values to correct the color of the pixel.

The color approximation degree hx2 of the present method is calculated in the following manner. A color X (r0, g0, b0) to be referred to is designated. Then, (r0', g0', b0') are calculated by removing a white component from X. In particular, it is calculated in accordance with the following expression:

$$(r0', g0', b0')=(r0, g0, b0)-min(r0, g0, b0)$$

FIG. 5 illustrates color components of RGB and a white component. As seen from FIG. 5, min(R, G, B) represent white components of RGB values, and to remove them is equivalent to extraction only of pure color components.

Similarly, RGB image data (r, g, b) are changed to values (r', g', b'), from which white components have been removed, using the following expression:

$$(r', g', b')=(r, g, b)-min(r, g, b)$$

Finite differences (dr, dg, db) of RGB are calculated.

$$(dr, dg, db)=(r0'-r', g0'-g', b0'-b')$$

This is equivalent to calculation of a finite difference in pure color component between two colors.

Figure 6:
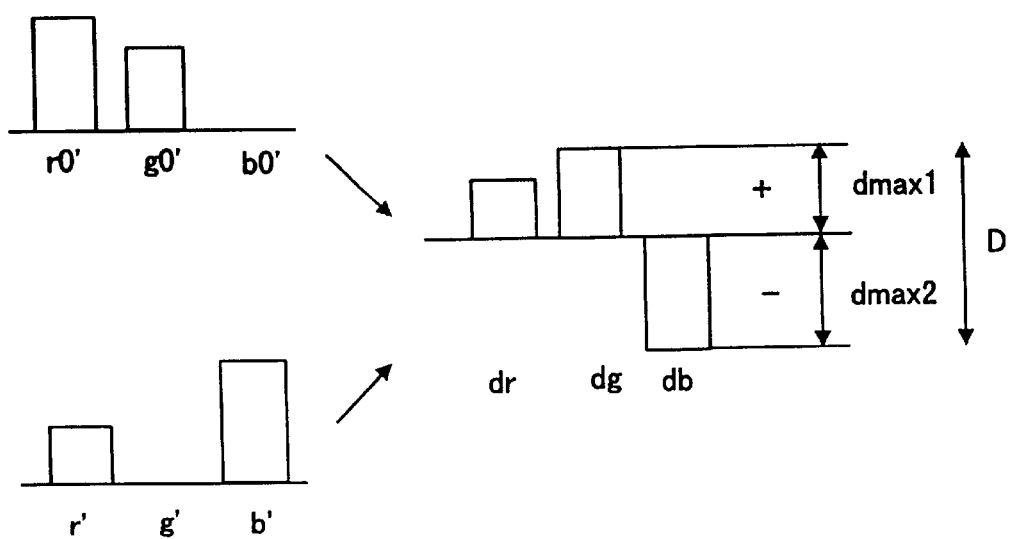
FIG. 6 is a diagrammatic view illustrating a distance between colors.

FIG. 6 illustrates a distance between colors. A maximum value dmax 1 among absolute values of positive values from among (dr, dg, db) (when all of the values are in the negative, dmax 1=0) and a maximum value dmax 2 among absolute values of negative values (when all of the values are in the positive, dmax 2=0) are added to each other to calculate the color distance D in accordance with $$D=dmax1+dmax2$$

When D is 0, the two colors are coincident with each other, and as D increases, the difference between the two colors increases. Where RGB are defined between 0 and 1.0, the maximum value of D is 2.0. The color approximation degree hx2 is calculated such that it is 1.0 when the two colors are coincident with each other, but it is 0.0 when the two colors are different sufficiently from each other. In particular, the color approximation degree hx2 is calculated by subtracting the D value from 1.0 (one half the maximum value of D). One half the maximum value of D is the distance from white to the primary colors of red, green and blue, and this value makes a reference to hx2. It is to be noted that, when hx2 exhibits a negative value, the color approximation degree is 0. In other words, hx2=1.0−D (however, where (1−D) is in the negative, hx2=0)

Here, the color approximation degree can be controlled by providing a weight coefficient W to color approximation degree calculation like $$hx2=1.0-W \times D$$

It is to be noted that, also in this instance, where the correction coefficients of RGB are represented by (a1, a2, a3), the applicable correction expression is (R', G', B')=(R, G, B)+hx2×(a1, a2, a3)

A plurality of such correction coefficients are stored into the correction coefficient storage section 4, and suitable ones of the correction coefficients are selected in accordance with a correction amount outputted from the correction object color designation section 2 and are outputted to the calculation section 5.

Second Embodiment

Figure 7:
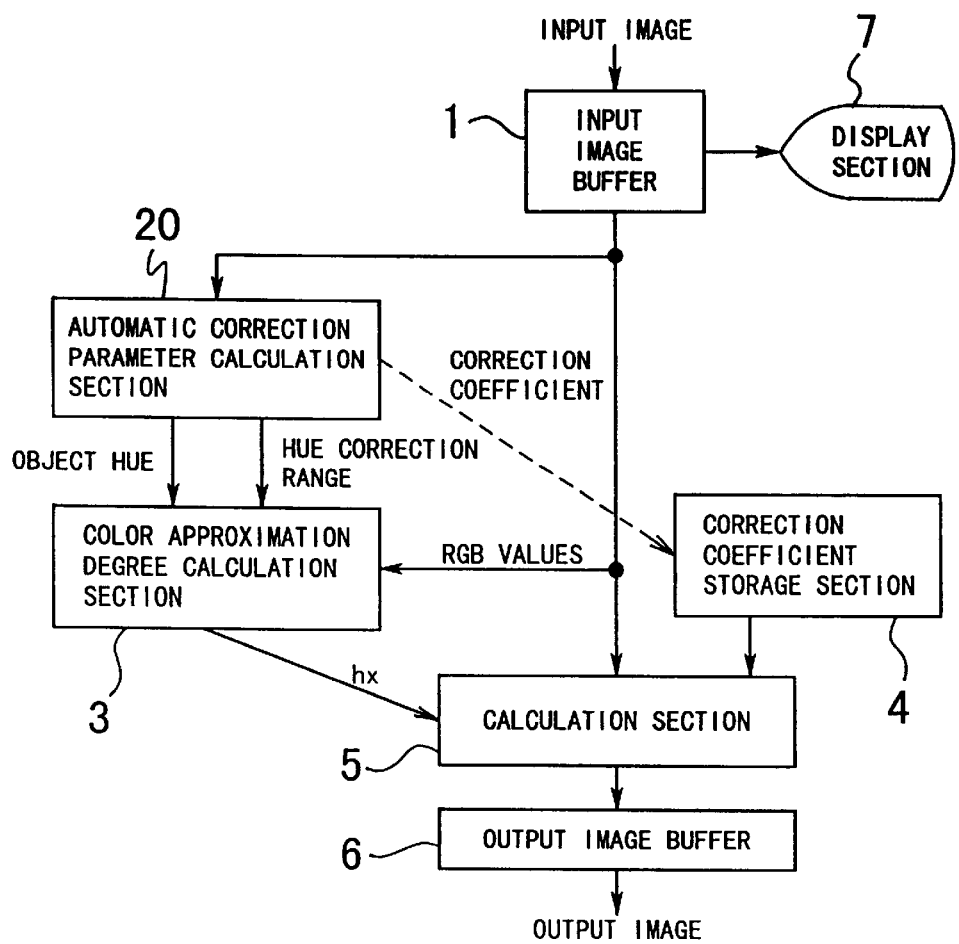
FIG. 7 is a block diagram of another image color correction apparatus to which the present invention is applied.
Figure 8:
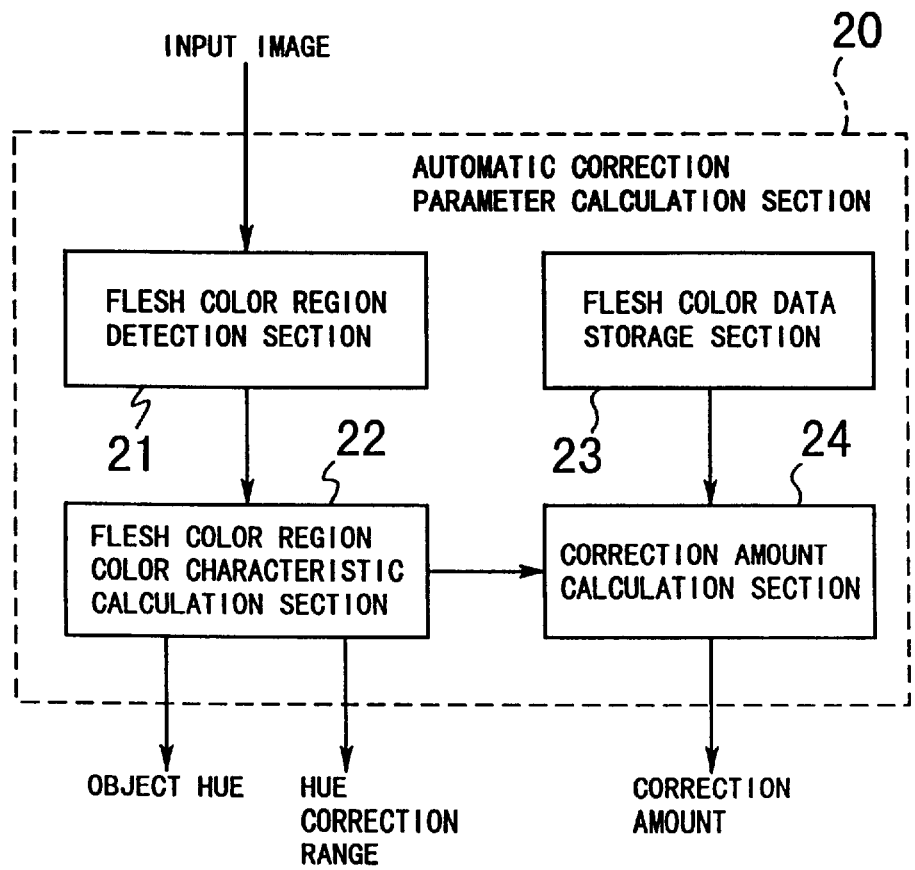
FIG. 8 is a block diagram showing an automatic correction parameter calculation section of the image color correction apparatus of FIG. 7.
Figure 9:
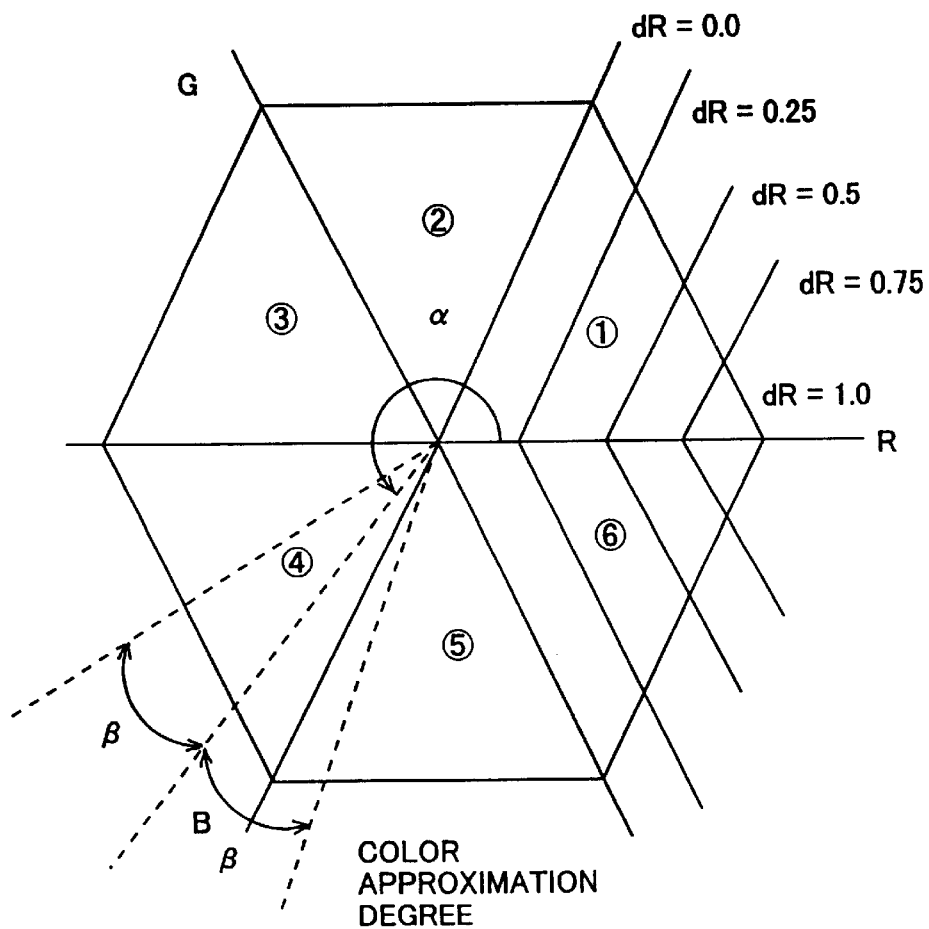
FIG. 9 is a schematic view illustrating a condition wherein an RGB space is projected on a plane perpendicular to an axis of white and black components.

Another image color correction apparatus to which the present invention is applied is shown in block diagram in FIG. 7, and an automatic correction parameter calculation section of the image color correction apparatus is shown in block diagram in FIG. 8.

While, in the color correction apparatus of the first embodiment described above, correction coefficients (a1, a2, a3) are provided in an interactive manner by manual operations of an operator, in the color correction apparatus of the present embodiment, such correction coefficients are calculated automatically based on a flesh color in an image.

Referring to FIGS. 7 and 8, a designated hue Hue and a hue range m are calculated based on input image data by an automatic correction parameter calculation section 20 and are transmitted to a color approximation degree calculation section 3. Simultaneously, correction coefficients (a1, a2, a3) are calculated and stored into a correction coefficient storage section 4. The automatic correction parameter calculation section 20 includes a flesh color region detection section 21, a flesh color region color characteristic calculation section 22, a flesh color data storage section 23 and a correction amount calculation section 24.

The flesh color region detection section 21 may mask only those pixels which are within certain threshold values of RGB values or may covert RGB values into YCbCr values and then mask only those pixels which are within certain threshold values of YCbCr values.

The flesh color region color characteristic calculation section 22 calculates a hue of a flesh color and a hue range from pixel data in the masked region and determines them as the designated hue Hue and the hue rage m, respectively. As a method of specifying a flesh color in an image, a method wherein a mean value of RGB values of pixel data in a masked region is determined as a flesh color Y may be used. A hue value H obtained by conversion of the thus obtained flesh color Y into HSV coordinates can be determined as a designated hue Hue. The hue range m may be determined in the following manner. For example, an upper limit value and a lower limit value of the hue values H in the masked region are checked, and absolute values dHhigh and dHlow of finite differences of the designated hue Hue from the upper limit value and the lower limit value, respectively. Then, a mean value of the absolute values dHhigh and dhlow is calculated and adopted as m. RGB values of a preferable flesh color calculated in advance are stored in the flesh color data storage section 23. The correction amount calculation section 24 calculates a finite difference between the RGB values of the preferable flesh color Y0 calculated in advance and the flesh color Y calculated from the pixels to obtain correction coefficients (a1, a2, a3).

Third Embodiment

Figure 10:
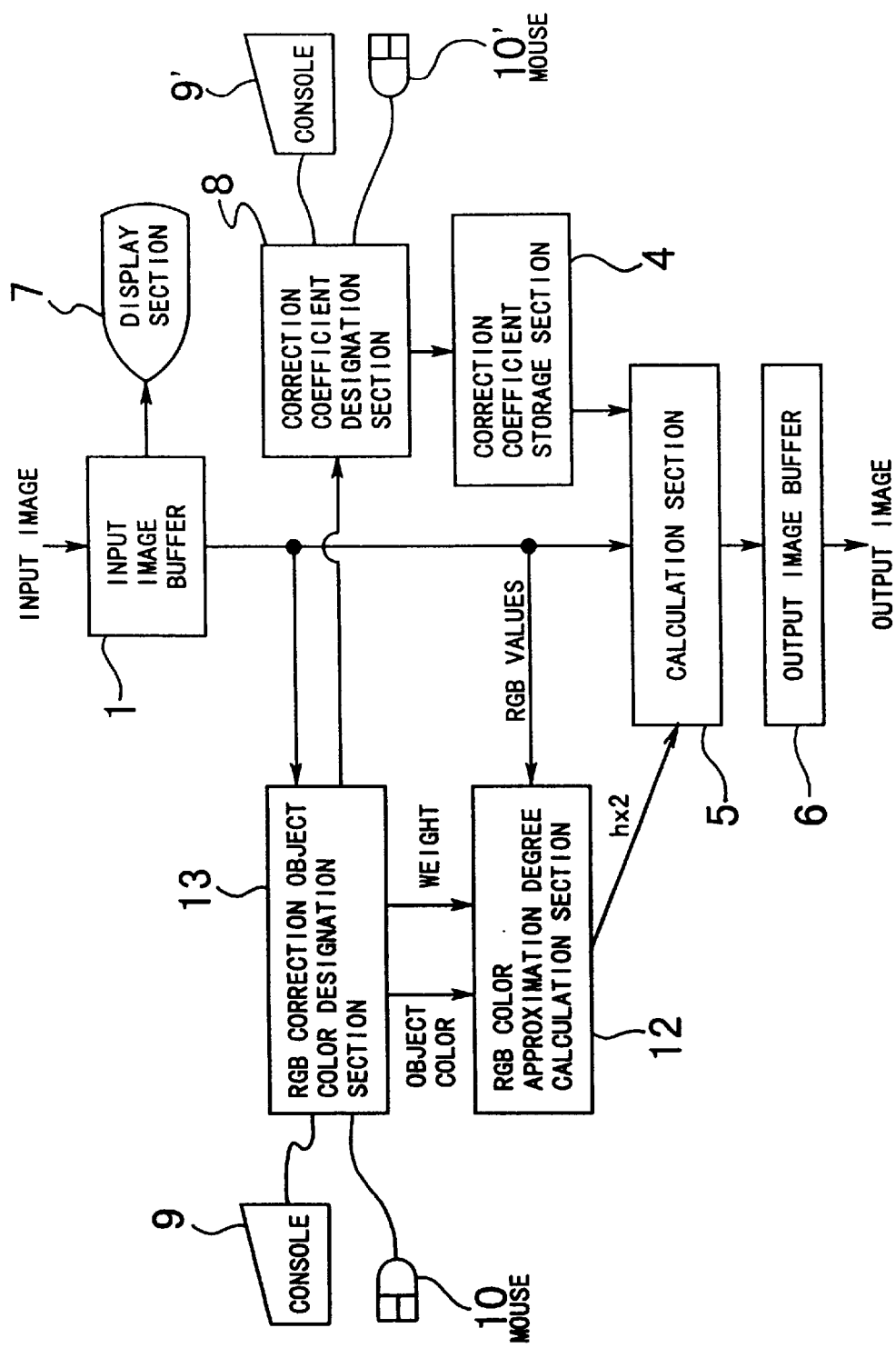
FIG. 10 is a block diagram of a further image color correction apparatus to which the present invention is applied.
Figure 11:
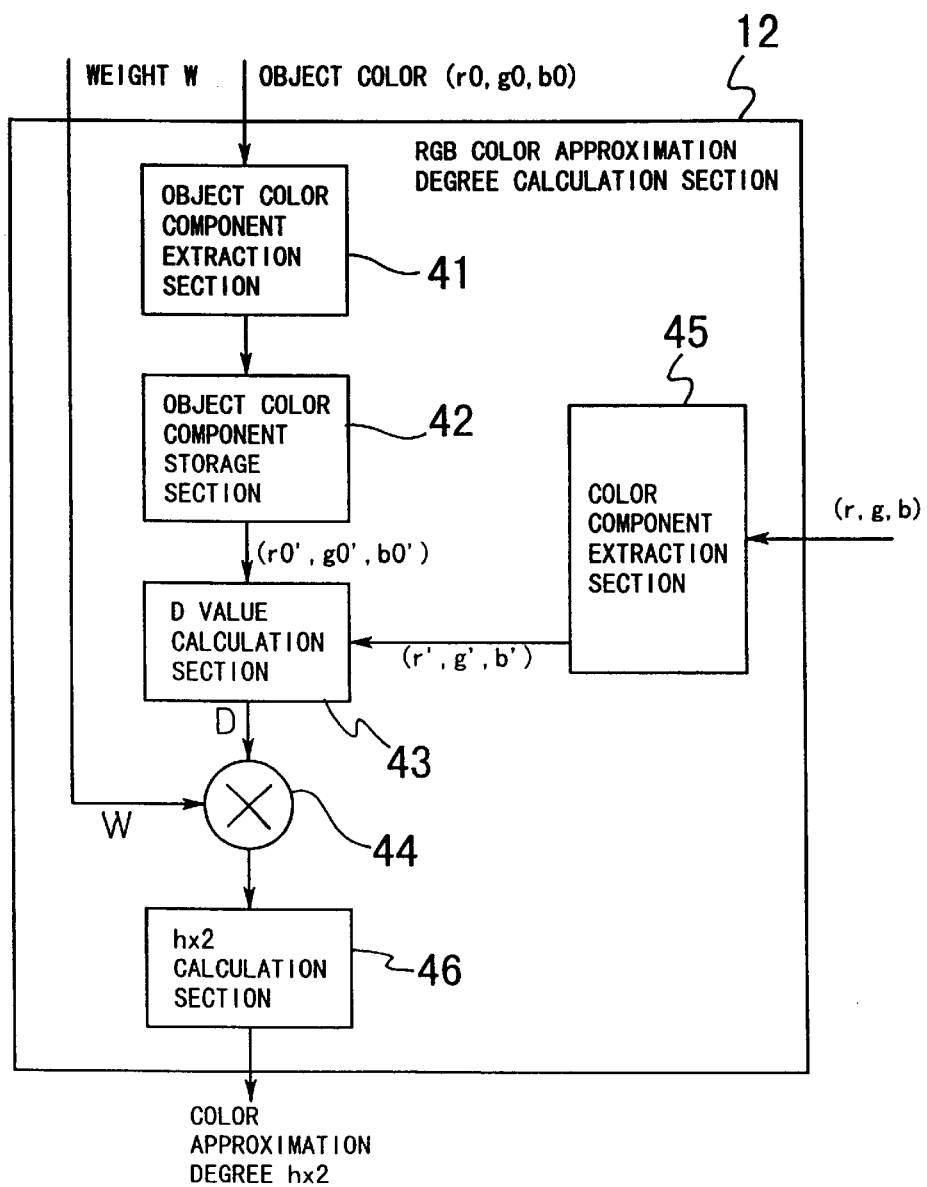
FIG. 11 is a block diagram showing an RGB color approximation degree calculation section of the image color correction apparatus of FIG. 10.

Referring now to FIG. 10, there is shown a further color correction apparatus to which the present invention is applied. The color correction apparatus of the present embodiment employs a finite difference between RGB values as a color approximation degree. First, an RGB correction object color designation section 13 designates a color X to be corrected with RGB values (r0, g0b0). Simultaneously, a weight W is designated. In this instance, similarly as in the color correction apparatus of the first embodiment, from the input screen shown in FIG. 2, the color X can be designated by the mouse 10. Also the weight W is designated by a similar method to that for the hue range m.

Then, similarly as in the first embodiment, correction coefficients (a1, a2, a3) are designated using a correction coefficient designation section 8.

Then, an RGB color approximation degree calculation section 12 calculates a color approximation degree hx2 regarding the color X for each pixel from X and pixel values in the image.

A calculation section 5 multiplies, similarly as in the color correction apparatus of the first embodiment, for each pixel, the color approximation degree hx2 and the RGB correction coefficients (a1, a2, a3) and adds resulting values to the original pixel values to effect color correction.

The color approximation degree hx2 is calculated by the RGB color approximation degree calculation section 12 in the following manner.

A color X (r0, g0, b0) to be referred to and a weight W are designated.

Then, white components are removed from X to obtain (r0', g0', b0') by an object color component extraction section 41 and stored into an object color component storage section 42. In other words, (r0', g0', b0')=(r0, g0, b0)−min(r0, b0, b0)

As seen from FIG. 5, min(R, G, B) represent white components of the RGB values, and to remove them is extraction only of a pure color component.

Similarly, for each pixel, RGB pixel data (r, g, h) are converted into values (r', g', b'), from which white components have been removed, by a color component extraction section 45 using the expression:

(r', g', b')=(r, g, b)−min(r, g, b)

Then, a D value representative of a distance between the colors is calculated by a D value calculation section 43. First, finite differences (dr, dg, db) of color components are calculated in accordance with the following expression:

(dr, dg, db)=(r0'−r', g0'−g', b0'−b')

This is equivalent to calculation of finite differences in pure color component between the two colors.

Thereafter, a maximum value dmax 1 among absolute values of positive values in (dr, dg, db) (when all (dr, dg, db) are in the negative, dmax=0) and a maximum value dmax 2 among absolute values of negative values (when all (dr, dg, db) are in the positive, dmax 2=0) are added to each other to obtain a color distance D (FIG. 6).

D=dmax1+dmax2

When D is 0, the two colors are coincident with each other, and as D increases, the difference between the two colors increases. Where RGB are defined between 0 and 1.0, D is 2.0 in the maximum.

Then, the color approximation degree hx2 is calculated using an hx2 calculation section 46. The color approximation degree hx2 is 1,0 when the two colors are coincident with each other, but is 0.0 where they are spaced sufficiently from each other. In particular, the color approximation degree hx2 is obtained by subtracting the D value from 1.0 (one half the maximum value of D). One half the maximum value of D is a distance from white to the primary colors of red, green and blue, and this value makes a reference to hx2. It is to be noted that, when hx2 is in the negative, the color approximation degree is 0.

hx2=1.0−D (where (1−D) is in the negative, hx2 is set to hx2=0).

If a weight W is designated, then the weight coefficient W can be provided to color approximation degree calculation using a multiplication section 49. In particular, the color approximation degree changes to a value obtained by the following expression:

hx2=1.0−W×D

It is to be noted that, also in the color correction apparatus of the present embodiment, if the correction coefficients of RGB are given by (a1, a2, a3), then the follow correction expression is used:

(R', G', B')=(R, G, B)+hx2×(a1, a2, a3)

Fourth Embodiment

Figure 12:
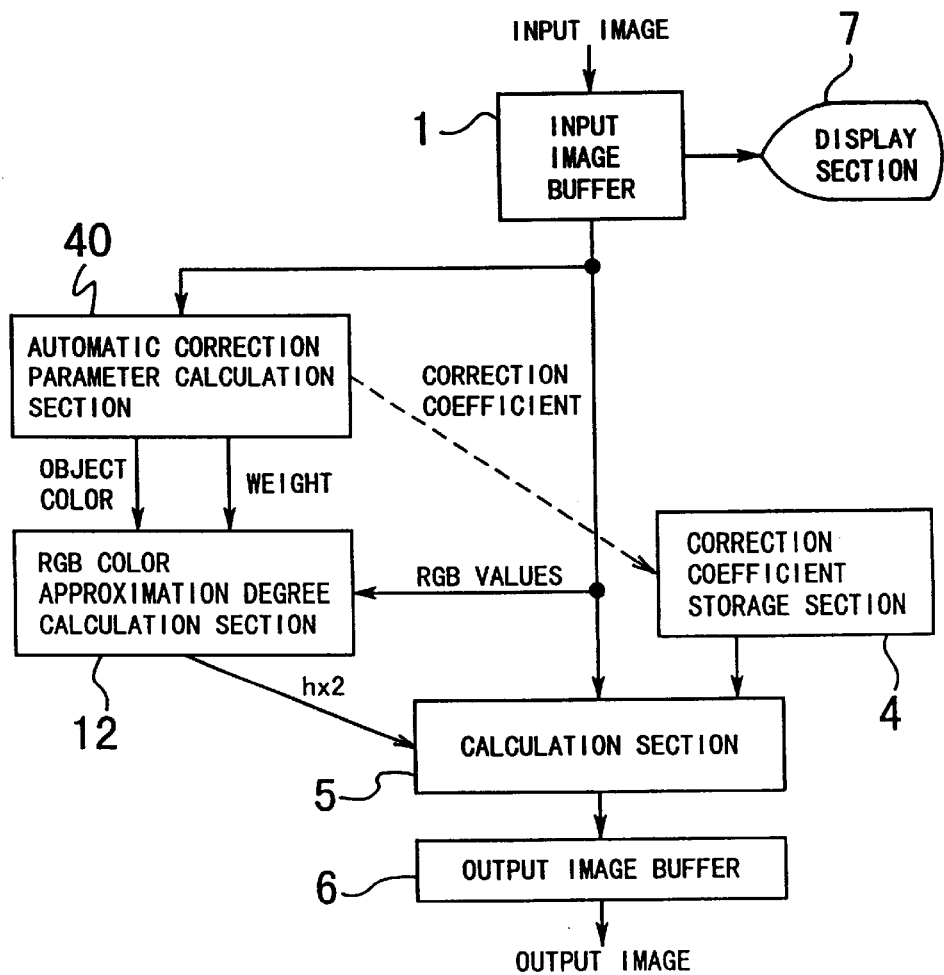
FIG. 12 is a block diagram of a further color correction apparatus to which the present invention is applied.
Figure 13:
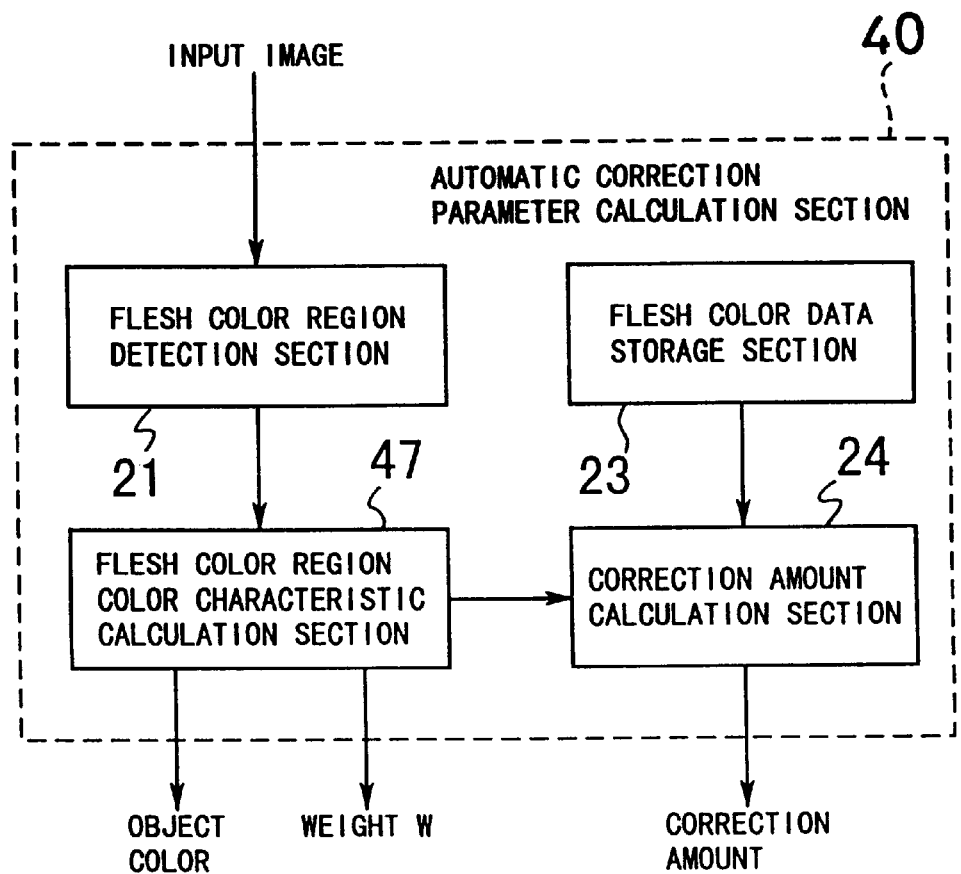
FIG. 13 is a block diagram showing an automatic correction parameter calculation section of the color correction apparatus of FIG. 12.

FIG. 12 shows a still further image color correction apparatus to which the present invention is applied. Further, FIG. 13 shows a detailed construction of an automatic correction parameter calculation section of the image color correction apparatus of FIG. 12.

The image color correction apparatus according to the present invention automatically calculates, similarly as in the image color correction apparatus of the second embodiment, a color X of an object of correction, a weight W and a correction coefficient based on a flesh color in an image. In particular, a correction objection color X and a weight W are calculated based on input image data by an automatic correction parameter calculation section 40 and transmitted to an RGB color approximation degree calculation section 12. Similarly, correction coefficients (a1, a2, a3) calculated and stored into a correction coefficient storage section 4. The automatic correction parameter calculation section 40 includes a flesh color region detection section 21, a flesh color region color characteristic calculation section 47, a flesh color data storage section 23, and a correction amount calculation section 24.

The flesh color region detection section 21 may mask only those pixels which are within a certain threshold value for RGB values or may convert RGB values into YCbCr values and then mask only those pixels which are within a certain threshold value.

The flesh color region color characteristic calculation section 47 calculates RGB values of a flesh color and a weight W from pixel data in the masked region and determines them as a hue X and a weight W of the correction object.

As a method of specifying a flesh color in an image, a simple mean of pixel data in the mask region for individual RGB is adopted may be used. The weight W can be calculated, for example, by checking dispersions of RGB values in the masked region and averaging the values of σr, σg and σb which are square roots of the dispersions.

In the flesh color data storage section 23, RGBs value of a preferable flesh color Y0 determined in advance are stored. The correction amount calculation section 24 calculates finite differences between the RGB values of the preferable flesh color Y0 determined in advance and a flesh color Y of an image to obtain correction coefficients (a1, a2, a3).

Fifth Embodiment

FIG. 15 shows a yet further color correction apparatus to which the present invention is applied. The color correction apparatus of the present embodiment is a modification to and is different from the color correction apparatus of the first embodiment in that it includes an HSV correction object color designation section 101 and a color approximation degree calculation section 102 in place of the correction object color designation section 2 and the color approximation degree calculation section 3 of the apparatus of FIG. 1. The HSV correction object color designation section 101 first designates a color X to be corrected by HSV values. Those HSV values are represented by (Hue, Sat, Val). As a designation method in this instance, a suitable region is selected, for example, from the display screen shown in FIG. 2 using a mouse, and pixel values at the location are converted into values of the HSV coordinate system. Simultaneously, a hue rage m, a saturation range sm and a lightness range vm are designated. In this instance, similarly as in the color correction apparatus of the first embodiment, from the screen shown in FIG. 2, they can be designated by a similar method to that for the hue range m using the mouse 10.

Then, similarly as in the color correction apparatus of the first embodiment, correction coefficients (a1, a2, a3) are designated using the correction coefficient designation section 8.

Thereafter, a color approximation degree hx3 regarding the color X is calculated for each pixel from X and a pixel value in the image by the color approximation degree calculation section 102.

The calculation section 5 multiplies, similarly as in the color correction apparatus of the first embodiment, the color approximation degree hx3 by the correction coefficients (a1, a2, a3) of RGB and adds resulting values to the original pixel values to effect color correction.

The color approximation degree hx3 is calculated by the color approximation degree calculation section 102 in the following manner.

HSV values (Hue, Sat, Val) of the color X to be referred to, a hue range m, a saturation range sm and a lightness range vm are designated.

RGB values of a noticed pixel are converted into HSV values, which are determined as (h1, s1, v1).

In this instance, the color approximation degree hx3 is calculated in accordance with the following expression:

hx3=((m−|Hue−h1|)/m)×((sm−|Sat−S1|)/sm)×((vm−|Val−v1|)/vm)

It is to be noted that, when m−|Hue−h1| is smaller than 0, when sm−|Sat−s1| is smaller than 0 or when vm−|Val−v1| is smaller than 0, hx3 is set to hx3=0. In FIG. 15, a hue finite difference evaluation section 103 calculates ((m−|Hue−h1|)/m), a saturation finite difference evaluation section 104 calculates ((sm−|Sat−S1|)/sm), and a lightness finite difference evaluation section 105 calculates ((vm−|Val−v1|)/vm). Then, the values thus obtained are multiplied by a multiplication section 106 to obtain a color approximation degree hx3, which is outputted from the multiplication section 106.

It is to be noted that, also in the color correction apparatus of the present embodiment, where the correction coefficients of RGB are represented by (a1, a2, a3), the following correction expression is used:

(R', G', B')=(R, G, B)+hx3×(a1, a2, a3)

Sixth Embodiment

Figure 14:
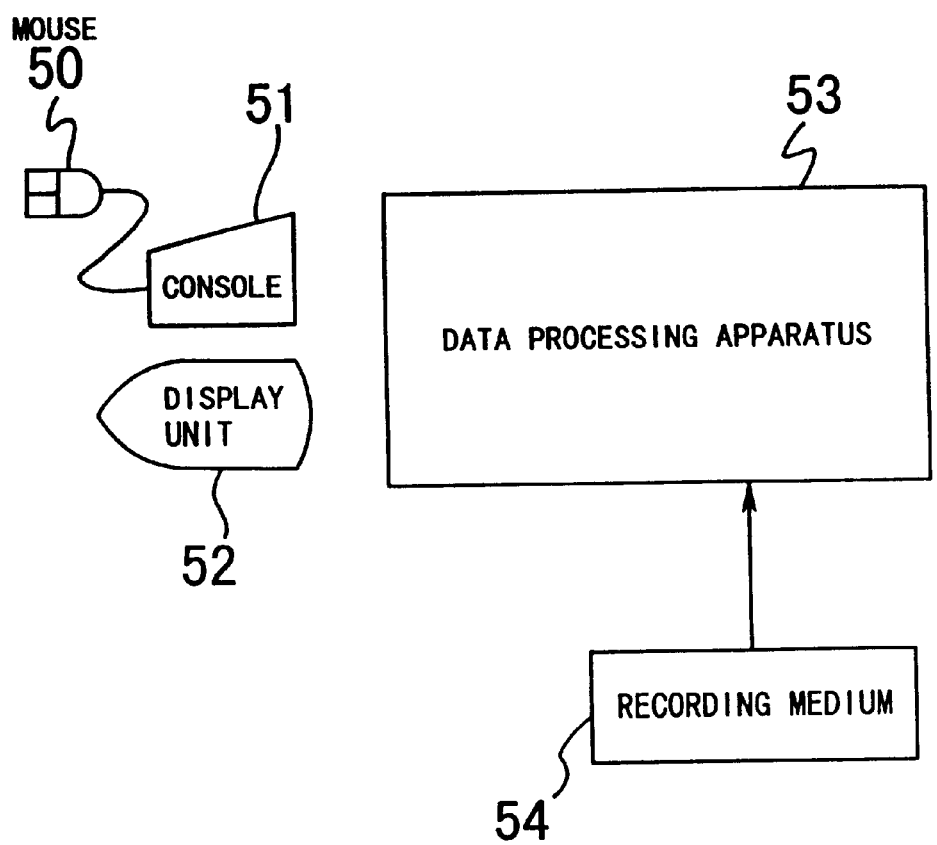
FIG. 14 is a block diagram of a yet further color correction apparatus to which the present invention is applied.

Referring now to FIG. 14, there is shown a yet further color correction apparatus to which the present invention is applied. The color correction apparatus includes a recording medium 54 on which an image correction program is recorded. The recording medium 54 may be a magnetic disk, a semiconductor memory or any other recording medium.

The image correction program is read into a data processing apparatus 53 from the recording medium 54 and controls operation of the data processing apparatus 53. The data processing apparatus 53 executes the following processing under the control of the correction program.

If a user observes a display unit 52 and designates a hue (Hue) which makes an object of correction of an input screen, a hue range (m) and a color after correction using an inputting apparatus 50 such as a mouse attached to a console 51, then the data processing apparatus 53 calculates a color approximation degree hx of each of noticed pixels of input pixels of the input image representative of an approximation degree to a designated hue and calculates correction coefficients (a1, a2, a3) of individual color signals R, G and B of the input pixels from the designated colors after correction. Then, the data processing apparatus 53 performs color correction of the image so that (R', G', B')=(R, G, B)+hx×(a1, a2, a3) may be satisfied.

Similarly, if the user designates a correction object color X (r0, g0, b0) and a weight coefficient W of the input image and a color after correction, then the data processing apparatus 53 calculates a color approximation degree hx2 of each of noticed pixels of the input pixels representative of an approximate value to the correction object color X, and calculates correction coefficients (a1, a2, a3) of individual color signals R, G and B of the input pixels from the designated color after correction. Then, the data processing apparatus 53 performs color correction so that (R', G', B')=(R, G, B)+hx2×(a1, a2, a3) may be satisfied.

Further, if the user similarly observes the display unit 52 and designates a hue (Hue) which makes an object of correction of an input image, a saturation (Sat), a lightness (Val), a hue range (m), a saturation range (sm), a lightness range (vm) and a color after correction using the console 51 such as a mouse attached to the console 51, then the data processing apparatus 53 first calculates a color approximation degree hx3 of each of noticed pixels of the input pixels representative of an approximation degree to the designated color and then calculates correction coefficients (a1, a2, a3) of the individual color signals R, G and B of the input pixels from the designated color after correction. Then, the data processing apparatus 53 performs color correction of the image so that (R', G', B')=(R, G, B)+hx3×(a1, a2, a3) may be satisfied.

Having now fully described the invention, it will be apparent to one of ordinary skill in the art that many changes and modifications can be made thereto without departing from the spirit and scope of the invention as set forth herein.

What is claimed is:

1. An image color correction apparatus, comprising:

correction object designation means for designating a hue (Hue) and a hue range (m) which make an object of correction of an input image;

color approximation degree calculation means for calculating, based on the hue and the hue range designated by said correction object designation means, a color approximation degree hx representative of an approximation degree of a hue of each of noticed pixels from among input pixels of the input image to the designated hue;

correction coefficient designation means for designating, where correction coefficients of color signals R, G an B of each of the input pixels are represented by (a1, a2, a3), the correction coefficients;

means for correcting the color signals R, G and B to color signals R', G' and B' in accordance with (R', G', B')=(R, G, B)+hx×(a1, a2, a3) where × is a multiplication symbol; and means for converting from a RGB coordinate system into a HSV coordinate system in the following manner: assuming:

$0 \leq R, G, B \leq MAX$;

$0 \leq H, S, V \leq MAX$;

then,

V=Imax=max(R, G, B)

a) when V=0,

S=0, H=unknown b) when V is not equal 0,

S=[(Imax−Imin)×MAX]/Imax (Imin=min(R, G, B))

H=[(G−B)×MAX]/(Imax−Imin)

(If (R=V))

H=[(B−R)×MAX]/(Imax−Imin)+MAX×2

If (G−V)

H=[(R−G)×MAX]/(Imax−Imin)+MAX×2

(if (B=V))

wherein H is normalized by,

H−H/6, wherein said color approximation degree calculation means calculates, for each of the noticed pixels from among the input pixels, where HSV values are represented by (h1, s1, v1), the color approximation degree hx in accordance with hx=((m−|Hue−h1|)/m)×s1×v1.

2. An image color correction apparatus as claimed in claim 1, further comprising display means for displaying the input image as a color image, pointing means for pointing a point on a screen of said display means, and numerical value inputting means for inputting a numerical value, and wherein said correction object designation means designates a hue of a pixel value at a point on the screen pointed by said pointing means and a hue range inputted separately as the hue (Hue) and the color range (m), respectively, which make the correction object of the input image, and said correction coefficient designation means designates input values of said numerical value inputting means as the correction coefficients (a1, a2, a3).

3. An image color correction apparatus as claimed in claim 2, wherein the hue range (m) inputted separately is selected from among a plurality of m values set in advance by a manual operation.

4. An image color correction apparatus as claimed in claim 1, further comprising a flesh color region detection section for masking only pixel values which are likely to represent a flesh color from within the entire input image, means for determining representative flesh color values from a plurality of ones of the masked pixel values, means for determining a flesh color hue range from a plurality of ones of the masked pixel values, means for determining hue components of the determined representative flesh color values as the hue (Hue) which makes an object of correction and determining the determined flesh color hue range as the hue range (m), and means for determining finite differences between a preferred flesh color set in advance and the representative flesh color values as the correction coefficients (a1, a2, a3).

5. An image color correction apparatus, comprising:

RGB correction object designation means for designating a correction object color X (r0, g0, b0) of and a weight coefficient W to an input image;

RGB color approximation degree calculation means for calculating, based on the correction object color X and the weight coefficient W designated by said RGB correction object destination means, a color approximation degree hx2 representative of an approximate value of a color of each of noticed pixels from among input pixels of the input image to the correction object color X;

correction coefficient designation means for designating, where correction coefficients of color signals R, G and B of each of the input pixels are represented by (a1, a2, a3), the correction coefficients; and calculating means for correcting the color signals R, G and B to color signals R', G', and B' in accordance with (R', G', B')=(R, G, B)+hx2×(a1, a2, a3) where × is a multiplication symbol;

wherein said RGB color approximation degree calculation means calculates, for each of the noticed pixels from among the input pixels, the color approximation degree hx2 in accordance with (r0', g0', b0')=(r0, g0, b0)−min(r0, g0, b0)

(r', g', b')=(r, g, b)−min(r, g, b)

(dr, dg, db)=(r0'−r', g0'−g', b0'−b')

D=dmax1+dmax2 hx2=1.0−W×D where (r, g, b) are the RGB values of the input pixel, dmax1 is the highest value from among absolute values of positive values of (dr, dg, db) except that, when all values of (dr, dg, db) are in the negative, dmax1=0, dmax2 is the highest value from among absolute values of negative values of (dr, dg, db) except that, when all values of (dr, dg, db) are in the positive, dmax2=1, and × is the multiplication symbol.

6. An image color correction apparatus as claimed in claim 5, further comprising display means for displaying the input image, pointing means for pointing a point on a screen of said display means, and numerical value inputting means for inputting a numerical value, and wherein said RGB correction object designation means designates RGB pixel values at a point on the screen pointed by said pointing means and a weight coefficient inputted separately as the color X (r0, g0, b0) and the weight coefficient W, respectively, which make the correction object, and said correction coefficient designation means designates values inputted by said numerical value inputting means as the correction coefficients (a1, a2, a3).

7. An image color correction apparatus as claimed in claim 6, wherein the weight coefficient W inputted separately is selected from among a plurality of W values set in advance by a manual operation.

8. An image color correction apparatus as claimed in claim 2, 3, 6, or 7, wherein said numerical value inputting means for inputting a numerical value is replaced by color pallet indication means for designating one of color samples displayed on the screen of said display means, and said correction coefficient designation means designates finite differences (r2−r0, g2−g0, b2−b0) between RGB values (r2, g2, b2) of the color designated by said color pallet indication means and RGB pixel values (r0, g0, b0) at a point on the screen designated by said pointing means as the correction coefficients (a1, a2, a3).

9. An image color correction apparatus as claimed in claim 5, further comprising a flesh color region detection section for masking only pixel values which are likely to represent a flesh color from within the entire input image, means for determining representative flesh color values from a plurality of ones of the masked pixel values, means for determining a flesh color weight from a plurality of ones of the masked pixel values, means for determining the determined representative flesh color values as the color X (r0, g0, b0) which makes an object of correction, means for determining the determined flesh color weight as the weight (W), and means for determining finite differences between a preferred flesh color set in advance and the representative flesh color values as the correction coefficients (a1, a2, a3).

10. A computer-readable recording medium which has recorded thereon an image correction program based on which a computer executes:

a procedure for causing a hue (Hue) and a hue range (m) which make an object of correction of an input image to be designated, another procedure for calculating, based on the hue and the hue range designated, a color approximation degree hx representative of an approximation degree of a hue of each of noticed pixels from among input pixels of the input image to the designated hue, a further procedure for causing a color after correction to be designated, a still further procedure for calculating correction coefficients (a1, a2, a3) for color signals R, G and B of each of the input pixels from the color after correction, a yet further procedure for correcting the color signals R, G and B to color signals R', G' and B' so that (R', G', B')=(R, G, B)+hx×(a1, a2 a3), where × is a multiplication symbol, may be satisfied, and another procedure for converting from a RGB coordinate system into a HSV coordinate system in the following manner:

assuming:
    $0 \leq R, G, B \leq MAX$;
    $0 \leq H, S, V \leq MAX$;
then,
    V=Imax=max(R, G, B)
        a) when V=0,
    S=0, H=unkmown
        b) when V is not equal 0,
    S=[(Imax−Imin)×MAX]/Imax
        (Imin=min(R, G, B))
    H=[(G−B)×MAX]/(Imax−Imin)
        (If (R=V))
    H=[(B−R)×MAX]/(Imax−Imin)+MAX×2
        If (G=V))
    H=[(R−G)×MAX]/(Imax−Imin)+MAX×2
        (if (B=V))
wherein H is normalized by,
    H−H/6, wherein said color approximation degree calculation means calculates, for each of the noticed pixels from among the input pixels, where HSV values are represented by (h1, s1, v1), the color approximation degree hx in accordance with $$hx=((m-|Hue-h1|)/m) \times s1 \times v1.$$

11. A computer-readable recording medium which has recorded thereon an image correction program based on which a computer executes:

a procedure for causing a correction object color X (r0, g0, b0) of and a weight coefficient W to an input image to be designated, another procedure for calculating, based on the correction object color X and the weight coefficient W designated, a color approximation degree hx2 representative of an approximate value of a color of each of noticed pixels from among input pixels of the input image to the correction object color X, a further procedure for causing a color after correction to be designated, a still further procedure for calculating correction coefficients of color signals R, G and B of each of the input pixels from the color after correction, a yet further procedure for correcting the color signals R, G and B to color signals R', G' and B' so that (R', G', B')=(R, G, B)+hx2×(a1, a2, a3), where × is a multiplication symbol, may be satisfied, and wherein the color aporoximation degree hx2 is calculated in accordance with (r0', g0' b0')=(r0, g0, b0)−min (r0, g0, b0)

(r', g', b')=(r, g, b)−min (r, g, b)

(dr, dg, db)=(r0'−r', g0'−g', b0'−b')

D=dmax1+dmax2 hx2=1.0−W×D where (r, g, b) are the RGB values of the input pixel, dmax1 is the highest value from among absolute values of positive values of (dr, dg, db) except that, when all values of (dr, dg, db) are in the negative, dmax1=0, dmax2 is the highest value from among absolute values of negative values of (dr, dg, db) except that, when all values of (dr, dg, db) are in the positive, dmax2=1, and × is the multiplication symbol.

12. An image color correction apparatus, comprising:

correction object designation means for designating a hue (Hue), a saturation (Sat), a lightness (Val), a hue range (m), a saturation range (sm) and a lightness range (vm) which make an object of correction of an input image;

color approximation degree calculation means for calculating, based on the hue and the hue range designated by said correction object designation means, a color approximation degree hx3 representative of an approximation degree of a hue of each of noticed pixels from among input pixels of the input image to the designated hue;

correction coefficient designation means for designating, where correction coefficients for color signals R, G and B of each of the input pixels are represented by (a1, a2, a3), the correction coefficients; and means for correcting the color signals R, G and B to color signals R', G' and B' in accordance with (R', G', B')=(R, G, B)+hx3×(a1, a2, a3) where × is a multiplication symbol; and means for converting from a RGB coordinate system into a HSV coordinate system in the following manner:
assuming:
0≦R, G, B≦MAX;
0≦H, S, V≦MAX;
then,
V=Imax=max(R, G, B)
   a) when V=0,
S=0, H=unknown
   b) when V is not equal 0,
S=[(Imax−Imin)×MAX]/Imax
   (Imin=min(R, G, B))
H=[(G−B)×MAX]/(Imax−Imin)
   (If (R=V))
H=[(B−R)×MAX]/(Imax−Imin)+MAX×2
   If (G−V))
H=[(R−G)×MAX]/(Imax−Imin)+MAX×2
   (if (B=V))
wherein H is normalized by,
   H−H/6,
wherein said color approximation degree calculation means calculates, for each of the noticed pixels from among the input pixels, where HSV values are represented by (h1, s1, v1), the color approximation degree hx3 in accordance with hx3=((m−|Hue−h1|)/m)×((sm−|Sat−s1|)/sm)×((vm−|Val−v1|)/vm) where × is a multiplication symbol.

13. An image color correction apparatus as claimed in claim 12, further comprising display means for displaying the input image as a color image, pointing means for pointing a point on a screen of said display means, and numerical value inputting means for inputting a numerical value, and wherein said correction object designation means designates a hue, a saturation and a lightness of a pixel value at a point on the screen pointed by said pointing means and a hue range, a saturation range and a lightness range inputted separately as the hue (Hue), the saturation (Sat), the lightness (Val), the color range (m), the saturation range (sm) and the lightness range (vm), respectively, which make the correction object of the input image, and said correction coefficient designation means designates input values of said numerical value inputting means as the correction coefficients (a1, a2, a3).

14. An image color correction apparatus as claimed in claim 13, wherein the hue range (m), the saturation range (sm) and the lightness range (vm) inputted separately are each selected from among a plurality of values set in advance by a manual operation.

15. A computer-readable recording medium which has recorded thereon an image correction program based on which a computer executes:

a procedure for causing a hue (Hue), a saturation (Sat), a lightness (Val), a hue range (m), a saturation range (sm) and a lightness range (vm) which make an object of correction of an input image to be designated, another procedure for calculating, based on the hue, the saturation, the lightness, the hue range, the saturation range and the lightness range designated, a color approximation degree hx3 representative of an approximation degree of a hue of each of noticed pixels from among input pixels of the input image to the designated hue, a further procedure for causing a color after correction to be designated, a still further procedure for calculating correction coefficients (a1, a2, a3) for color signals R, G and B of each of the input pixels from the color after correction, a yet further procedure for correcting the color signals R, G and B to color signals R', G' and B' so that (R', G', B')=(R, G, B)+hx3×(a1, a2, a3), where × is a multiplication symbol, may be satisfied, and a procedure for converting from a RGB coordinate system into a HSV coordinate system in the following manner: assuming:
  0≦R, G, B≦MAX;
  0≦H, S, V≦MAX;
then,
  V=Imax=max(R, G, B)
    a) when V=0,
    S=0, H=unknown
    b) when V is not equal 0,
    S=[(Imax−Imin)×MAX]/Imax
      (Imin=min(R, G, B))
    H=[(G−B)×MAX]/(Imax−Imin)
      (If (R=V))
    H=[(B−R)×MAX]/(Imax−Imin)+MAX×2
      If (G−V)
    H=[(R−G)×MAX]/(Imax−Imin)+MAX×2
      (if (B=V))
wherein H is normalized by,
  H−H/6,
wherein said color approximation degree calculation means calculates, for each of the noticed pixels from among the input pixels, where HSV values are represented by (h1, s1, v1), the color approximation degree hx3 in accordance with
hx3=((m−|Hue−h1|)/m)×((sm−|Sat−s1|)/sm)×((vm−|Val−v1|)/vm) where × is a multiplication symbol.

* * * * *

UNITED STATES PATENT AND TRADEMARK OFFICE
CERTIFICATE OF CORRECTION

PATENT NO. : 6,229,580 B1
DATED : May 8, 2001
INVENTOR(S) : Inoue

It is certified that error appears in the above-identified patent and that said Letters Patent is hereby corrected as shown below:

<u>Title page,</u>
Item [22], File Date, delete "November 17, 1997" should be -- November 18, 1997 --.

Signed and Sealed this

Twenty-ninth Day of January, 2002

Attest:

JAMES E. ROGAN
*Attesting Officer*  *Director of the United States Patent and Trademark Office*